United States Patent
Booth et al.

(10) Patent No.: US 7,308,171 B2
(45) Date of Patent: Dec. 11, 2007

(54) METHOD AND APPARATUS FOR OPTICAL ISOLATION IN HIGH POWER FIBER-OPTIC SYSTEMS

(75) Inventors: Timothy J. Booth, West Melbourne, FL (US); Ismail T. Yilmaz, Oviedo, FL (US); James F. Brennan, III, Winter Park, FL (US)

(73) Assignee: Raydiance, Inc., Orlando, FL (US)

( * ) Notice: Subject to any disclaimer, the term of this patent is extended or adjusted under 35 U.S.C. 154(b) by 42 days.

(21) Appl. No.: 11/281,144

(22) Filed: Nov. 16, 2005

(65) Prior Publication Data

US 2007/0110354 A1    May 17, 2007

(51) Int. Cl.
 *G02B 6/32* (2006.01)
 *G02B 6/00* (2006.01)
 *G02B 5/30* (2006.01)
 *G02B 27/28* (2006.01)

(52) U.S. Cl. .................. 385/34; 385/1; 385/2; 385/11; 385/33; 385/39; 385/40; 385/50; 359/246; 359/280; 359/281; 359/283; 359/484; 359/485; 359/501; 372/26; 372/27

(58) Field of Classification Search ................ 385/34; 359/484
 See application file for complete search history.

(56) References Cited

U.S. PATENT DOCUMENTS

| | | |
|---|---|---|
| 3,631,362 A | 12/1971 | Almasi et al. |
| 3,808,549 A | 4/1974 | Maurer |
| 3,963,953 A | 6/1976 | Thornton, Jr. |
| 4,194,813 A | 3/1980 | Benjamin et al. |
| 4,289,378 A | 9/1981 | Remy et al. |
| 4,718,418 A | 1/1988 | L'Esperance, Jr. |
| 4,722,591 A | 2/1988 | Haffner |
| 4,750,809 A | 6/1988 | Kafka et al. |
| 4,808,000 A | 2/1989 | Pasciak |
| 4,815,079 A | 3/1989 | Snitzer et al. |
| 4,824,598 A | 4/1989 | Stokowski |
| 4,829,529 A | 5/1989 | Kafka |
| 4,902,127 A | 2/1990 | Byer et al. |
| 4,913,520 A | 4/1990 | Kafka |
| 4,915,757 A | 4/1990 | Rando |

(Continued)

FOREIGN PATENT DOCUMENTS

EP     214100 A     3/1987

(Continued)

OTHER PUBLICATIONS

U.S. Appl. No. 10/916,368, filed Aug. 11, 2004, Richard Stoltz, Pulse Energy Adjustment for Changes in Ablation Spot Size.

(Continued)

*Primary Examiner*—Frank G. Font
*Assistant Examiner*—Ryan Lepisto
(74) *Attorney, Agent, or Firm*—Carr & Ferrell LLP (57) ABSTRACT

Methods and apparatus for optical isolation in high peak power fiber-optic systems prevent damage to a facet within a fiber-optic isolator caused by back-reflected light from, for example, an optical amplifier. Preventing damage to the facet may include expanding a mode area of the back-reflected light and/or reducing a change in refractive index.

32 Claims, 5 Drawing Sheets

U.S. PATENT DOCUMENTS

| | | | |
|---|---|---|---|
| 4,972,423 A | 11/1990 | Alfano et al. | |
| 5,014,290 A | 5/1991 | Moore et al. | |
| 5,022,042 A | 6/1991 | Bradley | |
| 5,043,991 A | 8/1991 | Bradley | |
| 5,132,996 A | 7/1992 | Moore et al. | |
| 5,162,643 A | 11/1992 | Currie | |
| 5,166,818 A | 11/1992 | Chase et al. | |
| 5,187,759 A | 2/1993 | DiGiovanni et al. | |
| 5,237,576 A | 8/1993 | DiGiovanni et al. | |
| 5,265,107 A | 11/1993 | Delfyett, Jr. | |
| 5,278,853 A * | 1/1994 | Shirai et al. | 372/37 |
| 5,291,501 A | 3/1994 | Hanna | |
| 5,302,835 A | 4/1994 | Bendett et al. | |
| 5,313,262 A | 5/1994 | Leonard | |
| 5,315,431 A * | 5/1994 | Masuda et al. | 359/281 |
| 5,329,398 A | 7/1994 | Lai et al. | |
| 5,367,143 A | 11/1994 | White, Jr. | |
| 5,400,350 A | 3/1995 | Galvanauskas | |
| 5,414,725 A | 5/1995 | Fermann et al. | |
| 5,418,809 A | 5/1995 | August, Jr. et al. | |
| 5,430,572 A | 7/1995 | DiGiovanni et al. | |
| 5,440,573 A | 8/1995 | Fermann | |
| 5,446,813 A * | 8/1995 | Lee et al. | 385/31 |
| 5,450,427 A | 9/1995 | Fermann et al. | |
| 5,479,422 A | 12/1995 | Fermann et al. | |
| 5,489,984 A | 2/1996 | Hariharan et al. | |
| 5,499,134 A | 3/1996 | Galvanauskas et al. | |
| 5,517,043 A | 5/1996 | Ma et al. | |
| 5,548,098 A | 8/1996 | Sugawara et al. | |
| 5,572,335 A | 11/1996 | Stevens | |
| 5,572,358 A | 11/1996 | Gabl et al. | |
| 5,585,652 A | 12/1996 | Kamasz et al. | |
| 5,585,913 A | 12/1996 | Hariharan et al. | |
| 5,592,327 A | 1/1997 | Gabl et al. | |
| 5,596,668 A | 1/1997 | DiGiovanni et al. | |
| 5,602,673 A * | 2/1997 | Swan | 359/281 |
| 5,602,677 A | 2/1997 | Tournois | |
| 5,617,434 A | 4/1997 | Tamura et al. | |
| 5,627,848 A | 5/1997 | Fermann et al. | |
| 5,631,771 A * | 5/1997 | Swan | 359/484 |
| 5,633,750 A | 5/1997 | Nogiwa et al. | |
| 5,633,885 A | 5/1997 | Galvanauskas et al. | |
| 5,642,447 A * | 6/1997 | Pan et al. | 385/31 |
| 5,651,018 A | 7/1997 | Mehuys et al. | |
| 5,656,186 A | 8/1997 | Mourou et al. | |
| 5,661,829 A * | 8/1997 | Zheng | 385/33 |
| 5,663,731 A | 9/1997 | Theodoras, II et al. | |
| 5,677,769 A | 10/1997 | Bendett | |
| 5,689,519 A | 11/1997 | Fermann et al. | |
| 5,696,782 A | 12/1997 | Harter et al. | |
| 5,701,319 A | 12/1997 | Fermann | |
| 5,703,639 A | 12/1997 | Farrier et al. | |
| 5,708,669 A | 1/1998 | DiGiovanni et al. | |
| 5,710,424 A | 1/1998 | Theodoras, II et al. | |
| 5,720,894 A | 2/1998 | Neev et al. | |
| 5,726,855 A | 3/1998 | Mourou et al. | |
| 5,734,762 A * | 3/1998 | Ho et al. | 385/11 |
| 5,778,016 A | 7/1998 | Sucha et al. | |
| 5,818,630 A | 10/1998 | Fermann et al. | |
| 5,822,097 A | 10/1998 | Tournois | |
| 5,847,863 A | 12/1998 | Galvanauskas et al. | |
| 5,862,287 A | 1/1999 | Stock et al. | |
| 5,862,845 A | 1/1999 | Chin et al. | |
| 5,867,304 A | 2/1999 | Galvanauskas et al. | |
| 5,875,408 A | 2/1999 | Bendett et al. | |
| 5,880,823 A | 3/1999 | Lu | |
| 5,880,877 A | 3/1999 | Fermann et al. | |
| 5,898,485 A | 4/1999 | Nati, Jr. | |
| 5,907,157 A | 5/1999 | Yoshioka et al. | |
| 5,920,668 A | 7/1999 | Uehara et al. | |
| 5,923,686 A | 7/1999 | Fermann et al. | |
| 5,936,716 A | 8/1999 | Pinsukanjana et al. | |
| 6,014,249 A | 1/2000 | Fermann et al. | |
| 6,020,591 A | 2/2000 | Harter et al. | |
| 6,034,975 A | 3/2000 | Harter et al. | |
| 6,061,373 A | 5/2000 | Brockman et al. | |
| 6,072,811 A | 6/2000 | Fermann et al. | |
| 6,075,588 A | 6/2000 | Pinsukanjana et al. | |
| 6,081,369 A | 6/2000 | Waarts et al. | |
| 6,088,153 A * | 7/2000 | Anthon et al. | 359/341.32 |
| 6,120,857 A | 9/2000 | Balooch et al. | |
| 6,130,780 A | 10/2000 | Joannopoulos et al. | |
| 6,141,140 A * | 10/2000 | Kim | 359/281 |
| 6,151,338 A | 11/2000 | Grubb et al. | |
| 6,154,310 A | 11/2000 | Galvanauskas et al. | |
| 6,156,030 A | 12/2000 | Neev | |
| 6,181,463 B1 | 1/2001 | Galvanauskas et al. | |
| 6,198,568 B1 | 3/2001 | Galvanauskas et al. | |
| 6,208,458 B1 | 3/2001 | Galvanauskas et al. | |
| 6,246,816 B1 | 6/2001 | Moore et al. | |
| 6,249,630 B1 | 6/2001 | Stock et al. | |
| 6,252,892 B1 | 6/2001 | Jiang et al. | |
| 6,256,328 B1 | 7/2001 | Delfyett et al. | |
| 6,269,108 B1 | 7/2001 | Tabirian et al. | |
| 6,275,250 B1 | 8/2001 | Sanders et al. | |
| 6,275,512 B1 | 8/2001 | Fermann | |
| 6,303,903 B1 | 10/2001 | Liu | |
| 6,314,115 B1 | 11/2001 | Delfyett et al. | |
| 6,327,074 B1 | 12/2001 | Bass et al. | |
| 6,327,282 B2 | 12/2001 | Hammons et al. | |
| 6,334,011 B1 | 12/2001 | Galvanauskas et al. | |
| 6,335,821 B1 | 1/2002 | Suzuki et al. | |
| RE37,585 E | 3/2002 | Mourou et al. | |
| 6,355,908 B1 | 3/2002 | Tatah et al. | |
| 6,362,454 B1 | 3/2002 | Liu | |
| 6,365,869 B1 | 4/2002 | Swain et al. | |
| 6,370,171 B1 | 4/2002 | Horn et al. | |
| 6,404,944 B1 | 6/2002 | Wa et al. | |
| 6,421,169 B1 | 7/2002 | Bonnedal et al. | |
| 6,433,303 B1 | 8/2002 | Liu et al. | |
| 6,433,305 B1 | 8/2002 | Liu et al. | |
| 6,433,760 B1 | 8/2002 | Vaissie et al. | |
| 6,501,590 B2 | 12/2002 | Bass et al. | |
| 6,522,460 B2 | 2/2003 | Bonnedal et al. | |
| 6,525,873 B2 | 2/2003 | Gerrish et al. | |
| 6,526,327 B2 | 2/2003 | Kar et al. | |
| 6,529,319 B2 | 3/2003 | Youn et al. | |
| 6,549,547 B2 | 4/2003 | Galvanauskas et al. | |
| 6,556,733 B2 * | 4/2003 | Dy et al. | 385/11 |
| 6,567,431 B2 | 5/2003 | Tabirian et al. | |
| 6,573,813 B1 | 6/2003 | Joannopoulos et al. | |
| 6,574,024 B1 | 6/2003 | Liu | |
| 6,576,917 B1 | 6/2003 | Silfvast | |
| 6,580,553 B2 | 6/2003 | Kim et al. | |
| 6,597,497 B2 | 7/2003 | Wang et al. | |
| 6,603,911 B2 | 8/2003 | Fink et al. | |
| 6,621,045 B1 | 9/2003 | Liu et al. | |
| 6,627,844 B2 | 9/2003 | Liu et al. | |
| 6,642,477 B1 | 11/2003 | Patel et al. | |
| 6,647,031 B2 | 11/2003 | Delfyett et al. | |
| 6,654,161 B2 | 11/2003 | Bass et al. | |
| 6,661,816 B2 | 12/2003 | Delfyett et al. | |
| 6,671,298 B1 | 12/2003 | Delfyett et al. | |
| 6,677,552 B1 | 1/2004 | Tulloch et al. | |
| 6,690,686 B2 | 2/2004 | Delfyett et al. | |
| 6,710,288 B2 | 3/2004 | Liu et al. | |
| 6,710,293 B2 | 3/2004 | Liu et al. | |
| 6,720,519 B2 | 4/2004 | Liu et al. | |
| 6,723,991 B1 | 4/2004 | Sucha et al. | |
| 6,728,439 B2 | 4/2004 | Weisberg et al. | |
| 6,735,229 B1 | 5/2004 | Delfyett et al. | |
| 6,738,144 B1 | 5/2004 | Dogariu | |
| 6,744,555 B2 | 6/2004 | Galvanauskas et al. | |
| 6,749,285 B2 | 6/2004 | Liu et al. | |

| | | |
|---|---|---|
| 6,774,869 B2 | 8/2004 | Biocca et al. |
| 6,782,207 B1 | 8/2004 | Efimov |
| 6,787,734 B2 | 9/2004 | Liu |
| 6,788,864 B2 | 9/2004 | Ahmad et al. |
| 6,791,060 B2 | 9/2004 | Dunsky et al. |
| 6,801,551 B1 | 10/2004 | Delfyett et al. |
| 6,803,539 B2 | 10/2004 | Liu et al. |
| 6,804,574 B2 | 10/2004 | Liu et al. |
| 6,807,375 B2 | 10/2004 | Dogariu |
| 6,815,638 B2 | 11/2004 | Liu |
| 6,819,694 B2 | 11/2004 | Jiang et al. |
| 6,819,702 B2 | 11/2004 | Sverdlov et al. |
| 6,819,837 B2 | 11/2004 | Li et al. |
| 6,822,251 B1 | 11/2004 | Arenberg et al. |
| 6,829,517 B2 | 12/2004 | Cheng et al. |
| 6,878,900 B2 | 4/2005 | Corkum et al. |
| 6,897,405 B2 | 5/2005 | Cheng et al. |
| 2002/0176676 A1 | 11/2002 | Johnson et al. |
| 2002/0186915 A1* | 12/2002 | Yu et al. ................ 385/11 |
| 2004/0231682 A1 | 11/2004 | Stoltz |
| 2005/0035097 A1 | 2/2005 | Stoltz |
| 2005/0038487 A1 | 2/2005 | Stoltz |
| 2005/0061779 A1 | 3/2005 | Blumenfeld et al. |
| 2005/0065502 A1 | 3/2005 | Stoltz |
| 2005/0074974 A1 | 4/2005 | Stoltz |
| 2005/0077275 A1 | 4/2005 | Stoltz |
| 2005/0127049 A1 | 6/2005 | Woeste et al. |
| 2005/0167405 A1 | 8/2005 | Stoltz et al. |
| 2005/0171516 A1 | 8/2005 | Stoltz |
| 2005/0171518 A1 | 8/2005 | Stoltz et al. |
| 2005/0177143 A1 | 8/2005 | Bullington et al. |
| 2005/0195726 A1 | 9/2005 | Bullington et al. |
| 2006/0056480 A1 | 3/2006 | Mielke et al. |

FOREIGN PATENT DOCUMENTS

| | | | |
|---|---|---|---|
| EP | 691563 A2 * | 1/1996 | |
| JP | 2003181661 A | 7/2003 | |
| WO | WO 9428972 A1 | 12/1994 | |
| WO | WO 2004/105100 A2 | 12/2004 | |
| WO | WO 2004/114473 A2 | 12/2004 | |
| WO | WO 2005/018060 A2 | 2/2005 | |
| WO | WO 2005/018061 A2 | 2/2005 | |
| WO | WO 2005/018062 A2 | 2/2005 | |
| WO | WO 2005/018063 A2 | 2/2005 | |

OTHER PUBLICATIONS

U.S. Appl. No. 11/057,867, filed Feb. 13, 2005, Michael Marshall Mielke, Method of Generating an Ultra-Short Pulse Using a High-Frequency Ring Oscillator.

U.S. Appl. No. 11/057,868, filed Feb. 13, 2005, Michael Marshall Mielke, Amplifying of high Energy Laser Pulses.

U.S. Appl. No. 11/224,867, filed Sep. 12, 2005, Peter Delfyett, Laser Ablation Method and Apparatus Having a Feedback Loop and Control Unit.

U.S. Appl. No. 11/233,634, filed Sep. 22, 2005, James F. Brennan, III, Wavelength-Stabilized Pump Diodes for Pumping Gain Media in an Ultrashort Pulsed Laser System.

U.S. Appl. No. 11/112,256, filed Apr. 22, 2005, James F. Brennan, III, Bragg Fibers in Systems for the Generation of High Peak Power Light.

U.S. Appl. No. 10/916,365, filed Aug. 11, 2005, Richard Stoltz, Ablative Material Removal with a Preset Removal Rate or Volume or Depth.

U.S. Appl. No. 11/333,824, filed Jan. 17, 2006, Laurent Vaissie, Post Amplfication Optical Isolator.

U.S. Appl. No. 10/568,135, filed Feb. 10, 2006, Jeff Bullington, High-Power-Optical-Amplifier Using a Number of Spaced, Thin Slabs.

U.S. Appl. No. 11/291,609, filed Nov. 30, 2005, Laurent Vaissie, Combination Optical Isolator and Pulse Compressor.

Yeh et al., "Theory of Bragg Fiber", Journal of the Optical Society America, Sep. 1978, pp. 1196, vol. 68, No. 9.

Engeness et al., "Dispersion Tailoring and Compensation by Modal Interations in Omniguide Fibers," Optics Express, May 19, 2003, pp. 1175-1196, vol. 11, No. 10.

Fink et al., "Guiding Optical Light in Air Using an All-Dielectric Structure," Journal of Lightwave Technology, Nov. 1999, pp. 2039-2041, vol. 17, No. 11.

Siegman, "Unstable Optical Resonators", Applied Optics, Feb. 1974, pp. 353-367, vol. 13, No. 2.

Koechner, "Solid State Laser Engineering", Oct. 29, 1999, Section 5.5, pp. 270-277, 5th Edition, Springer.

Chen et al. "Dispersion-Managed Mode Locking", Journal of the Optical Society of America B, Nov. 1999, pp. 1999-2004, vol. 16, No. 11, Optical Society of America.

Resan et al. "Dispersion-Managed Semiconductor Mode-Locked Ring Laser", Optics Letters, Aug. 1, 2003, pp. 1371-1373, vol. 28, No. 15, Optical Society of America.

Dasgupta, S. et al., "Design of Dispersion-Compensating Bragg Fiber with an Ultrahigh Figure of Merit," Optics Letters, Aug. 1, 2005, vol. 30, No. 15, Optical Society of America.

Mohammed, W. et al., "Selective Excitation of the TE01 Mode in Hollow-Glass Waveguide Using a Subwavelength Grating," IEEE Photonics Technology Letters, Jul. 2005, vol. 17, No. 7, IEEE.

Delfyett, P et al., "Ultrafast Semiconductor Laser-Diode-Seeded Cr:LiSAF Rengerative Amplifier System", Applied Optics, May 20, 1997, pp. 3375-3380, vol. 36, No. 15, Octoical Society of America.

Levy et al., "Engineering Space-Variant INhomogeneous Media for Polarization Control," Optics Letters, Aug. 1, 2004, pp. 1718-1720, vol. 29, No. 15, Optical Society of America.

Ibanescu et al., "Analysis of Mode Structure in Hollow Dielectric Waveguide Fibers," Physical Review E 67, 2003, The American Physical Society.

* cited by examiner

METHOD AND APPARATUS FOR OPTICAL ISOLATION IN HIGH POWER FIBER-OPTIC SYSTEMS

BACKGROUND OF THE INVENTION

1. Field of the Invention

The present invention generally relates to the field of fiber-optic systems, and in particular to methods and apparatuses for optical isolation in high peak power fiber-optic systems.

2. Description of the Related Art

In high power fiber-optic systems, optical isolators are used to protect low-power components from damage that may be caused by back-reflected light from amplifiers or other components. For example, a fiber-optic optical isolator may be used to protect a laser light source or a pre-amplifier from destabilizing or damaging feedback.

Generally, a fiber-optic optical isolator is a non-reciprocal optical device based on magneto-optic rotation of a plane of polarization of a propagating optical signal. Such a phenomenon is observed in certain crystals and commonly referred to as the "Faraday effect." In the high power systems, the back-reflected light may carry enough power to cause irreversible physical damage to an output fiber of the optical isolator. Such damage often occurs at an end facet the output fiber inside of the optical isolator because there is typically a significant change in index of refraction between the output fiber and atmospheric gas, or other medium, disposed on the other side of the end facet.

SUMMARY OF THE INVENTION

Various deficiencies of the prior art are addressed by the present invention of a method and apparatus for optical isolation in high peak power fiber-optic systems. In some embodiments, the invention prevents damage to a facet of an output fiber of a fiber-optic isolator caused by back-reflected light from, e.g., a power amplifier of an optical signal. In some embodiments, this damage is prevented by defocusing the back-reflected light before it passes through a region of significant change in index of refraction.

In a first aspect of the present invention, there is provided a fiber-optic isolator having an input module including an input fiber, an input polarizer, and an input collimator, a state of polarization rotator module, and an output module including an output fiber having a facet, an output polarizer, and an output collimator. A beam expanding device is disposed between the output fiber and the output collimator and is configured to expand (e.g., defocus) any back-reflected light. By selecting an appropriate index of refraction for the beam-expanding device, the potential for damage at the facet of the output fiber is reduced. By expanding the back-reflected light, before the light leaves the beam-expanding device, the potential for damage at a facet of the beam expanding device is reduced.

In further aspects of the invention, there are provided methods for preventing damage to fiber-optic isolators used in high-power optical systems where an output of the optical isolator is coupled to an input of the last gain stage for amplifying a propagating optical signal.

Various embodiments of the invention include an optical isolator, comprising an input module including an input fiber, an input polarizer, and an input collimator, a state of polarization rotator module, and an output module including an output fiber having a facet, a beam expanding device, an output polarizer, and an output collimator, the beam expanding device configured to prevent damage to the facet of the output fiber due to back-reflected light in the output fiber.

Various embodiments of the invention include an optical isolator, comprising an input module including an input fiber, an input polarizer, and an input collimator, a state of polarization rotator module, and an output module including a multimode output fiber, an output polarizer, and an output collimator.

Various embodiments of the invention include a method, comprising generating an optical signal, coupling the optical signal into an optical isolator, the optical isolator having an input fiber and an output fiber, coupling an output from the optical isolator to an input of a first optical amplifier, receiving back-reflected light at the output fiber from the first optical amplifier, and reducing a fluence of the back-reflected light at a facet between the output fiber and an air gap to a value that is less than the damage threshold of the facet, by expanding the received back-reflected light.

Various embodiments include an optical isolator comprising an input module including an input fiber, an output module including an output fiber having a facet within the optical isolator, and means for reducing damage to the facet of the output fiber caused by any back-reflected light received through the output fiber.

BRIEF DESCRIPTION OF THE DRAWINGS

The teachings of the present invention will become apparent by considering the following detailed description in conjunction with the accompanying drawings, in which.

Herein, identical reference numerals are used, where possible, to designate identical elements that are common to the figures. The images in the drawings are conventionally simplified for illustrative purposes and are not depicted to scale.

The appended drawings illustrate exemplary embodiments of the invention and, as such, should not-be considered limiting of the scope of the invention.

DETAILED DESCRIPTION OF THE INVENTION

Embodiments of the present invention generally relate to methods and apparatuses for optical isolation in high peak power fiber-optic systems. The invention may advantageously be utilized for preventing damage to a facet of an output fiber of a fiber-optic isolator caused by back-reflected light from an input of an optical amplifier.

Figure 1A:
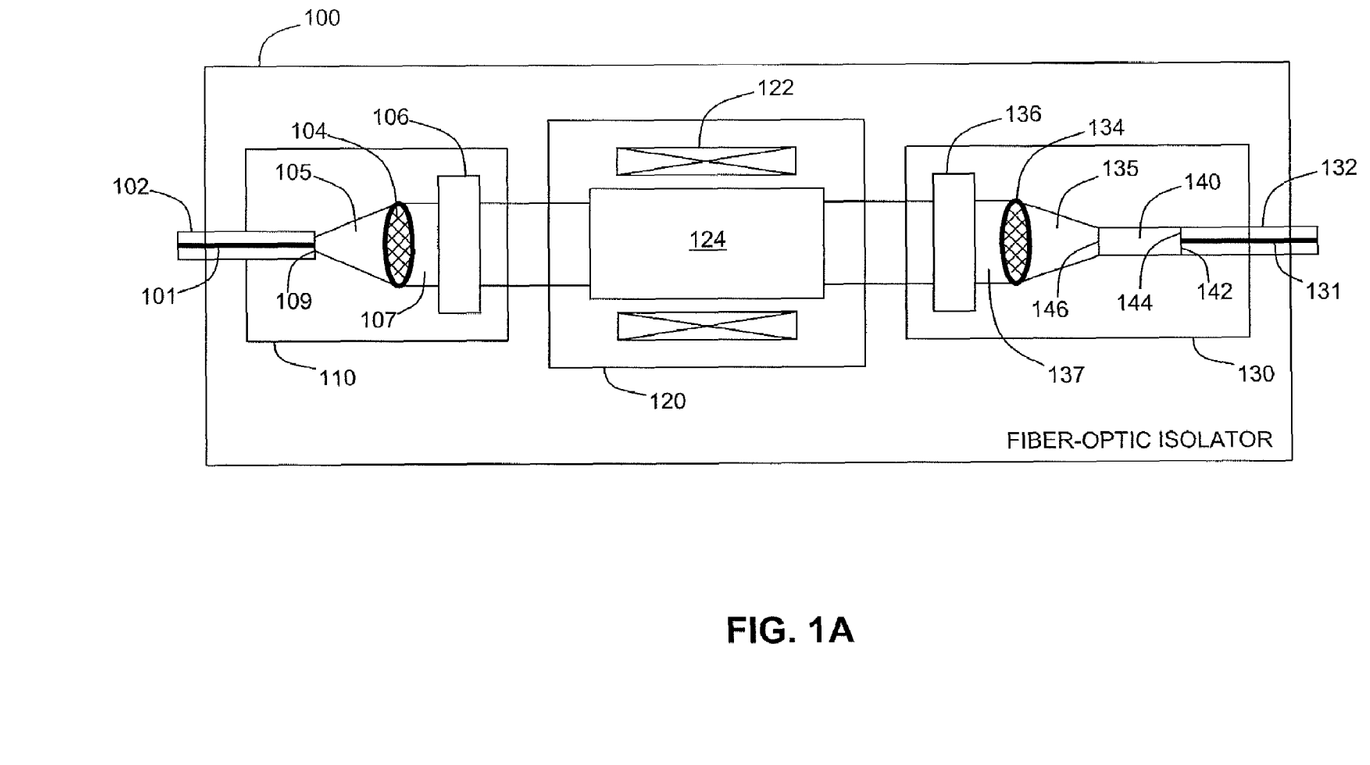
FIGS. 1A and 1B depict a high-level block diagram illustrating an exemplary fiber-optic isolator in accordance with various embodiments of the invention.

FIG. 1A depicts a high-level block diagram illustrating an exemplary fiber-optic isolator 100 in accordance with various embodiments of the present invention. In the depicted embodiments, the fiber-optic isolator 100 comprises an input module 110, a state of polarization rotator module 120, and an output module 130.

The input module 110 includes an input fiber 102, an input collimator 104, and an input polarizer 106. Correspondingly, the output module 130 includes an output fiber 132, an output collimator 134, and an output polarizer 136. The state of polarization rotator module 120 generally includes a crystal media 124 and a magnetic unit 122. Transmission axes (not shown) of the input and output polarizers 106 and 136 are disposed at an angle of 45 degrees to one another. In a further embodiment, the isolator 100 may include an optional heat sink (not shown) configured to increase power-handling capabilities of the isolator by dissipating energy of the back-reflected light.

The input fiber 102 is generally a single mode fiber or a large mode area (LMA) fiber. The output fiber 132 can be a LMA fiber, a multimode fiber (a multimode fiber that supports only a few modes is also referred to as a "few-moded" fiber.), or a single mode fiber. The crystal media 124 facilitates non-reciprocal rotation of a plane of polarization of a propagating light by 45 degrees. In operation, the isolator 100 transmits light in a forward direction from the input fiber 102 to the output fiber 132 ("transmission direction"), and rejects the light propagating in the reverse direction, i.e., from the output fiber 132 to the input fiber 102 ("isolation direction").

The output fiber 132 is terminated ("capped") using a beam expanding device 140 coupled to a facet 142 of the output fiber 132. In one embodiment, a first facet 144 of the beam expanding device 140 is fused to the facet 142 of the output fiber 132, and a second facet 146 of the beam expanding device 140 is optically coupled to the output collimator 134. The beam expanding device 140 is selected to reduce the change in index of refraction experienced by the back-reflected light as the back-reflected light passes through facet 142, relative to the index of refraction change that would be experienced without the beam expanding device 140. By reducing this change in index of refraction, the power density that can be passed through facet 142 before damage results is increased.

The beam expanding device 140 is configured to expand the back-reflected light and reduce the power density of the back-reflected light at the facet 146 relative to the facets 142 and 144. An air gap is typically disposed between output collimator 134 and facet 146. Thus, the potential for damage at facet 142 is reduced by matching index of refraction, and the potential for damage at facet 146 (where there may be a larger change in index of refraction due to the air gap) is reduced by expanding the back-reflected light. In some embodiments, the total amount of back-reflected light that can be received through output fiber 132 without damage to fiber-optic isolator 100 is increased relative to systems that do not include beam expanding device 140. In some embodiments, an outer diameter of the beam expanding device 140 is substantially equal to or greater than an outer diameter of a cladding of the outer fiber 132. In some embodiments, the output fiber 132 comprises a multimode fiber and the output module 130 is configured to excite a single mode of the multimode fiber. In embodiments wherein output fiber 132 is a multimode fiber, expanding device 140 is optional.

The beam expanding device 140 may be considered as extending the output fiber 132 and providing a relatively larger facet for the back-reflected light to exit the output fiber 132/beam expanding device 140 combination, thus reducing fluence (e.g. power density) at the exit. For the back-reflected light, there is relatively little refractive index change at the interface between the facet 142 of the output fiber 132 and the first facet 144 of the beam expanding device 140. However, there may be a relatively large refractive index change at the interface between the second facet 146 of the beam expanding device 140 and the air space (or other optical element) between the beam expanding device 140 and the collimator 134. By providing a relatively large area at the second facet 146 of the beam expanding device 140, the greater change in refractive index occurs where the back-reflected light is of reduced power density. This reduces the possibility of damage for high peak power back-reflected light.

In various embodiments, the beam expanding device 140 may be formed from a coreless optical fiber (e.g., coreless optical fiber having a length of about. 10 μm to 10 mm) and/or comprise a graded index (GRIN) lens. In various embodiments, the beam expanding device 140 includes a multimode fiber, a few-moded fiber, or a large mode field fiber, a GRIN fiber, or the like. In some exemplary embodiments, a diameter of the second facet 146 with is about 2 to 20 times greater than the diameter of the core 131, resulting in low power density of the back-reflected light at the facet 146.

Collimators 104 and 134 optically couple the input fiber 102 to the input polarizer 106 and the output fiber 132 to output polarizer 136, respectively. In particular, a facet 109 of the input fiber 102 may be disposed at approximately a focal point of the input collimator 104, and the second facet 146 of the beam expanding device 140 may be disposed approximately at a focal point of the output collimator 134.

In case of an optical signal propagating in the transmission direction, the input collimator 104 collects light 105 exiting a core 101 of the input fiber 102 and forms a beam 107 propagating through the input polarizer 106, the crystal media 124, and the output polarizer 136. Correspondingly, the output collimator 134 transforms the beam 137 exiting the output polarizer 136 into a beam 135 focused onto the second facet 146 of the beam expanding device 140. Typically, beam 135 passes through an air gap between output collimator 134 and beam expanding device 140.

The collimators 104 and 134 are illustratively shown as stand-alone lenses. In alternate embodiments (not shown), at least one of the input collimator 104 or the output polarizer 136 may be a portion of the input fiber 102 or the beam expanding device 140, respectively.

In some embodiments, the facets 109 and/or 146 are polished and/or coated using an optional anti-reflective coating. In further embodiments (not shown), at least one of the facets 109 or 146 may be angle-polished to an angle in a range from about 0 to 12 degrees (preferably, about 8 degrees) with respect to an optical axis between the input fiber 102 and the output fiber 132.

Further, an optical axis of at least one of the polarizers 106 or 136 may be tilted, with respect to the optical axis between the fibers 102 and 132, by about 0 to 7 degrees (preferably, about 3.6 degrees). Tilting the optical axis may be desirable because the angular polarized field of the polarizers 106 and/or 136 is not symmetrical about the normal angle at the face of the polarizers, and is dependent upon wavelength, ranging from about 5.9 degrees at 350 nm to about 7.5 at 2300 nm. At a wavelength of 1.5 um, the semi-polarized field of a KL Glan laser becomes zero on one side and 7.3 degrees on the other side of the normal. Thus, to have linear polarization, the incident beam should strike the first polarizer 106 at 7.3/2=3.6 degrees. The crossed polarizer 136 is also tilted so that the output is symmetrical to the incident beam. Tilting the optical axis is performed in some embodiments by angling the input fiber 102 and the output fiber 132 by 3.6 degrees with respect to a housing of the fiber-optic isolator 100.

Figure 1B:
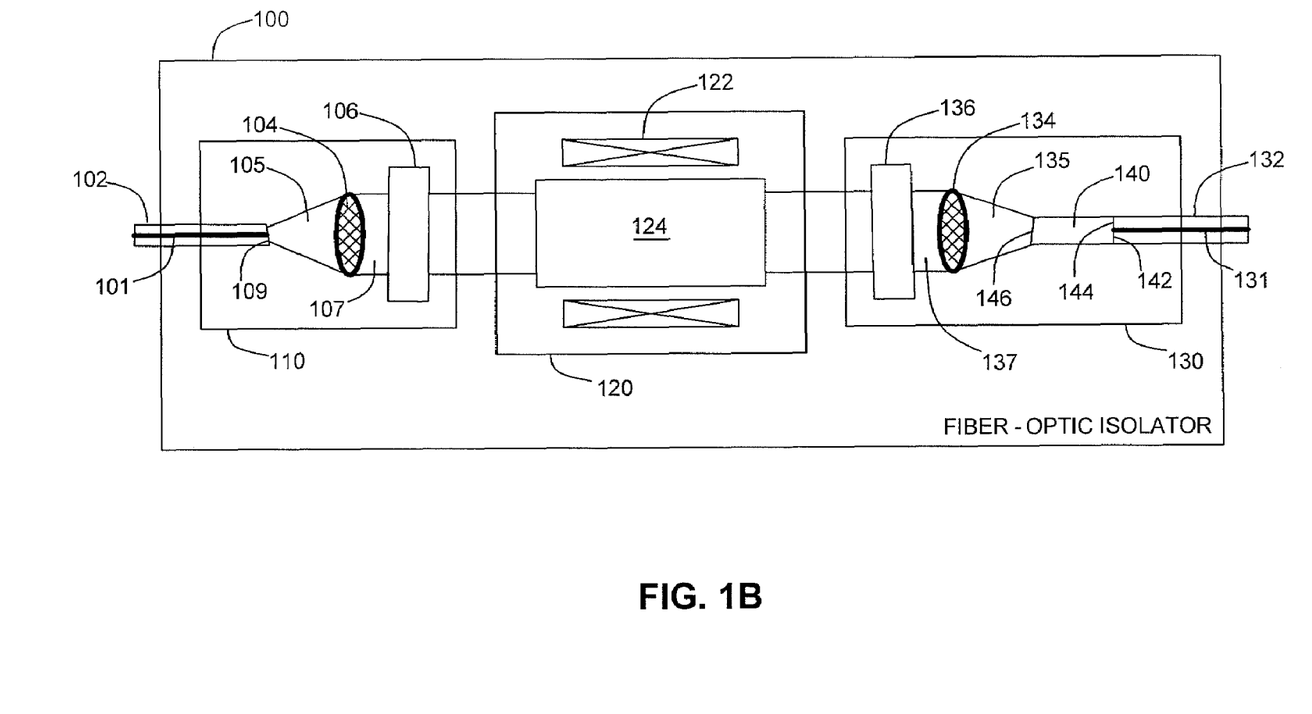

FIG. 1B depicts the exemplary fiber-optic isolator 100 wherein the input fiber 102 is angle polished, the second facet 146 is angle polished, and the polarizers 106 and 136 are tilted with respect to the axis of the input and output fibers.

Figure 2:
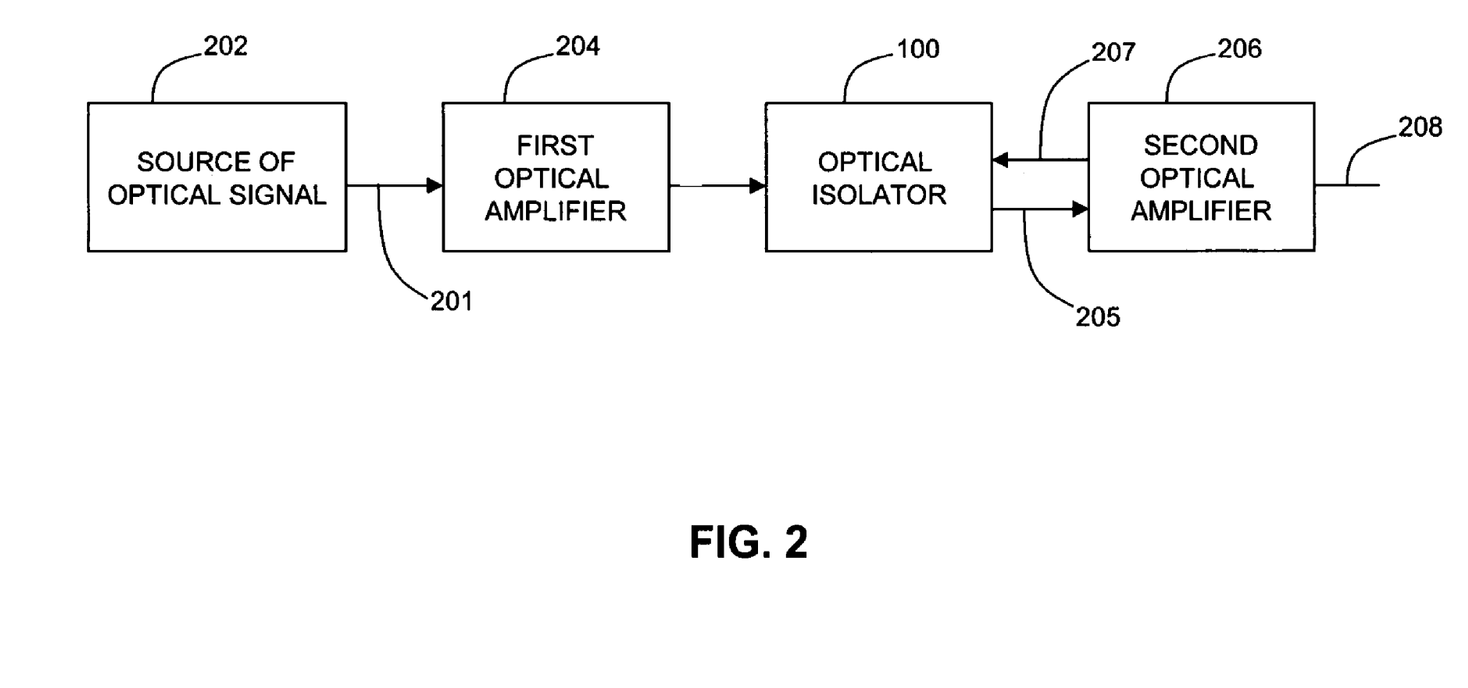
FIG. 2 depicts a high-level block diagram of an exemplary system of the kind wherein the fiber-optic isolator of FIG. 1 may be used, according to various embodiments of the invention.

FIG. 2 depicts a high-level block diagram of an exemplary system 200 of the kind where the fiber-optic isolator of FIG. 1 may be used. The system 200 may be used, for example, to generate high peak power optical pulses, high average power optical signals, among other laser-based high power applications.

Illustratively, the system 200 comprises a laser source 202 of an optical signal 201 at, for example, 1550 nm, an optional first optical amplifier (pre-amplifier) 204 configured to amplify the signal 201, the fiber-optic isolator 100, and a second optical amplifier 206. The amplifier 206 may be coupled to a delivery and/or compressor fiber 208, such as a Bragg fiber, a photonic bandgap fiber, a metallized hollow core fiber, and the like.

The optical amplifiers 204 and 206 are optionally erbium-doped fiber-optic amplifiers. In one embodiment, the laser source 202 is a fiber-optic ring laser, and the second amplifier 206 is a last gain stage for amplifying the optical signal 201. One suitable ring laser is described in a commonly assigned U.S. patent application Ser. No. 11/229,302, "Actively Stabilized Systems for the Generation of Ultrashort Optical Pulses," filed on Sep. 15, 2005, which is incorporated herein by reference.

In FIG. 2, an input of the isolator 100 (i.e., the input fiber 102) is coupled to an output of the first optical amplifier 204. Alternatively, when the first optical amplifier 204 is not used in the system 200, the input of the isolator 100 is coupled to an output of the laser source 202.

Referring to FIGS. 1 and 2, an output of the isolator 100 (i.e., the output fiber 132) is coupled to an input of the second amplifier 206. In operation, an optical signal 205 exiting the isolator 100 is amplified by the amplifier 206. A portion of the optical signal 205 and/or a signal propagating in the reverse direction (i.e., from an output to the input of the second amplifier 206), together, form back-reflected light 207. The back-reflected light 207 propagates along the output fiber 132 towards the isolator 100. From the output fiber 132, the back-reflected light 207 enters the beam expanding device 140.

In the system 200, the signal 205 may have an average power of about 1 to 10 W or greater and a peak power of about 1 to 50 KW or greater. The power density of the signal 205 in the output fiber 132 may exceed 1 GW/cm$^2$. Each of an average power and a peak power of the back-reflected light 207 may reach about 2 to 20 times that of the respective values of the optical signal 205.

In the beam expanding device 140, the back-reflected light 207 is expanded over an area having a substantially greater cross-section (e.g., 2 to 20 times greater) than a diameter of the core 131 of the output fiber 132. The back-reflected light 207 may be partially absorbed in the beam expanding device 140 and a cladding of the outer fiber 132. A remaining portion of the back-reflected light 207 exits the beam expanding device 140 through the second facet 146 and is then directed to be absorbed by other components of the isolator 100, including the crystal media 124, polarizer 136, polarizer 106 and an optional heat sink.

Figure 3:
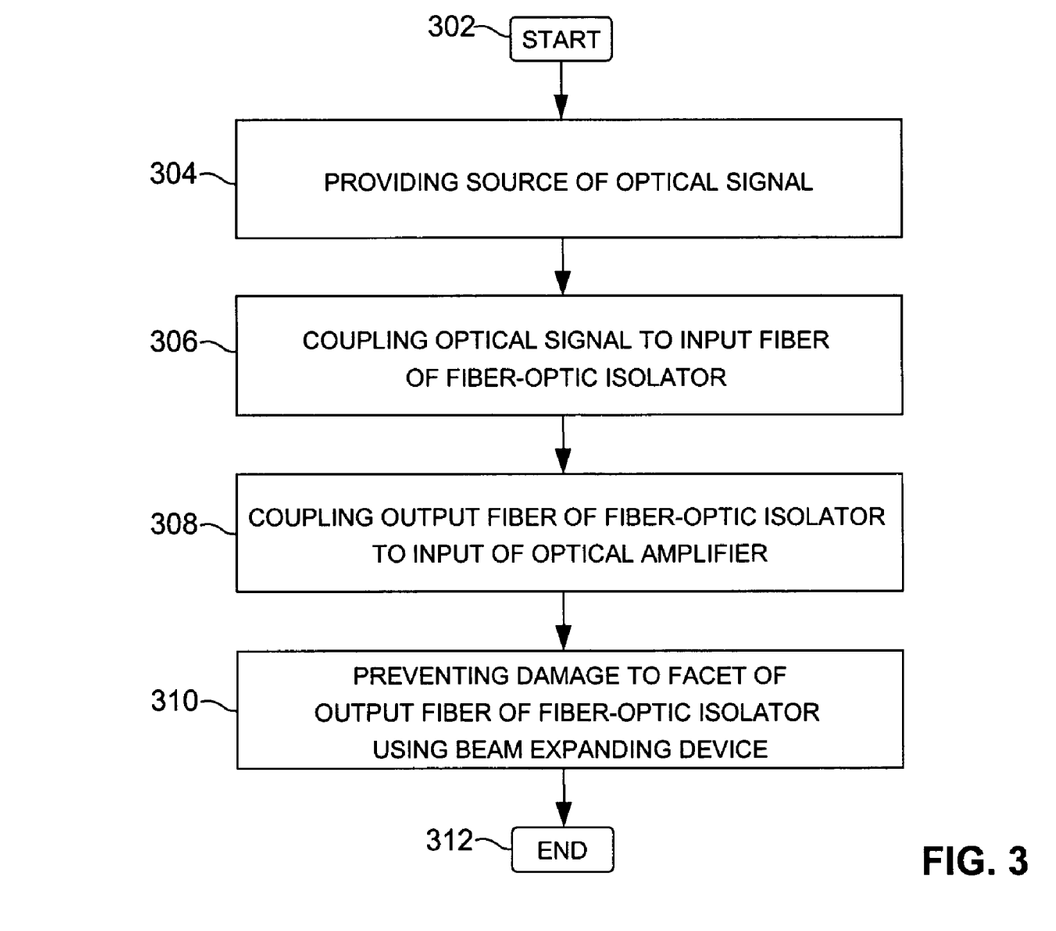
FIG. 3 depicts a flow diagram illustrating a method for optical isolation, in accordance with various embodiments of the invention.

FIG. 3 depicts a flow diagram illustrating a method 300 for optical isolation in accordance with one embodiment of the present invention. To best understand the invention, the reader should simultaneously refer to FIGS. 1-3.

The method 300 starts at step 302 and proceeds to step 304. At step 304, a source of an optical signal is provided (e.g., the laser source 202). At step 306, the optical signal (e.g., the signal 201) is coupled to an input fiber (e.g., the input fiber 102) of a fiber-optic isolator (e.g., the isolator 100). At step 308, the output fiber of the fiber-optic isolator may be coupled to an input of an optical amplifier, such as the second amplifier 206. At step 310, fluence of any back-reflected light at a potential damage point (e.g., the facet 146 of the beam expanding device 104) within the fiber-optic isolator is reduced to a value less than a damage threshold. In one embodiment, the fluence is reduced using a beam expanding device (e.g., the beam expanding device 140) matched to the facet 142 of the output fiber 132, as discussed above in reference to FIG. 1. At step 312, the method 300 ends.

Figure 4:
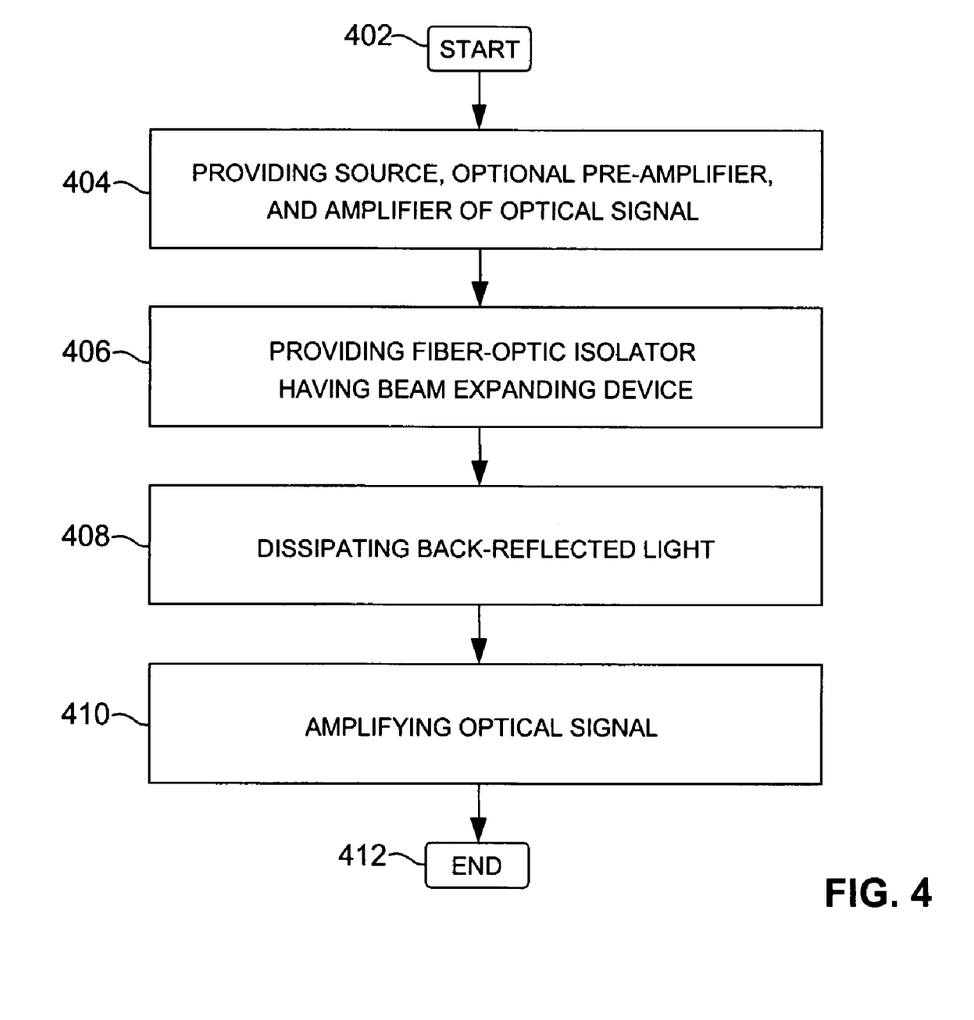
FIG. 4 depicts a flow diagram illustrating a method for preventing damage to a fiber-optic isolator caused by back-reflected light in the system of FIG. 2, in accordance with various embodiments of the invention.

FIG. 4 depicts a flow diagram illustrating a method 400 for preventing damage to a fiber-optic isolator caused by back-reflected light in the system of FIG. 2 in accordance with one embodiment of the present invention. In some embodiments, processing steps of the method 400 are sequentially performed in the depicted order. In alternate embodiments, at least two of these processing steps may be performed contemporaneously or in a different order. To best understand the invention, the reader should simultaneously refer to FIGS. 1-2 and 4.

The method 400 starts at step 402. At step 404, a source of an optical signal (e.g., the laser source 202 of the optical signal 201), an optional pre-amplifier (e.g., the first amplifier 204), and an amplifier of the optical signal (e.g., the second amplifier 206) are provided.

At step 406, a fiber-optic isolator configured for preventing damage to the facet due to back-reflected light is provided (e.g., the fiber-optic isolator 100). In some embodiments, the damage to the fiber-optic isolator is prevented by using a beam expanding device (e.g., the beam expanding device 140) coupled to a facet of an output fiber of the isolator, as discussed above in reference to FIG. 1. An input of the fiber-optic isolator (e.g., the input fiber 102) is coupled, either directly or through the optional pre-amplifier, to an output of the source of the optical signal. An output of the fiber-optic isolator (e.g., the output fiber 132) is coupled to an input of the amplifier of the optical signal. In operation, the amplifier originates the back-reflected light (e.g., the back-reflected light 207), which, along the output fiber of the fiber-optic isolator, propagates into the beam expanding device, as discussed above in reference to FIG. 2.

At step 408, the back-reflected light is passed from an output fiber to a beam expanding device, and dispersed by the beam expanding device. At step 410, an output of the amplifier is coupled to a respective recipient of the amplified optical signal. In a high-power fiber optic system (e.g., the system 200), such coupling may be provided using a delivery and/or compressor fiber, e.g., a Bragg fiber, a photonic bandgap fiber, a metallized hollow core fiber, and the like. At step 412, the method 400 ends.

While the foregoing is directed to the illustrative embodiment of the present invention, other and further embodiments of the invention may be devised by those skilled in the art without departing from the basic scope thereof that is determined by the claims that follow.

What is claimed is:

1. An optical isolator, comprising:
    an input module including an input fiber, an input polarizer, and an input collimator;

a state of polarization rotator module; and an output module including an output fiber having a facet, a beam expanding device, an output polarizer, and an output collimator, the beam expanding device configured to prevent damage to the facet of the output fiber due to back-reflected light in the output fiber.

2. The isolator of claim 1 wherein the beam expanding device is configured to prevent damage to the facet of the output fiber by reducing a change in refractive index.

3. The isolator of claim 1 wherein the beam expanding device is coupled to the facet of the output fiber, the beam expanding device configured to reduce a fluence of the back-reflected light below a damage threshold of a facet of the beam expanding device by dispersing the back-reflected light.

4. The isolator of claim 3 wherein the beam expanding device comprises a coreless optical fiber.

5. The isolator of claim 1 wherein the beam expanding device comprises a coreless optical fiber of length from about 10 µm to 10 mm.

6. The isolator of claim 1 wherein the beam expanding device comprises a graded index (GRIN) lens.

7. The isolator of claim 1 wherein the beam expanding device is configured to prevent damage to the facet of the output fiber by reducing a change in refractive index, and is configured to prevent damage to a facet of the beam expanding device by dispersing any back-reflected light.

8. The isolator of claim 1 wherein the output fiber comprises a multimode fiber.

9. The isolator of claim 1 wherein the output fiber comprises a multimode fiber and the output module is configured to excite a single mode of the multimode fiber.

10. The isolator of claim 1 wherein the output fiber comprises a large mode area fiber.

11. The isolator of claim 1 wherein a facet of the input fiber is angle polished to reduce reflections from the facet.

12. The isolator of claim 1 wherein a facet of the input fiber is antireflection coated to reduce reflections from the facet.

13. The isolator of claim 1 wherein a facet of the beam expanding device is angle polished to reduce reflections from the facet.

14. The isolator of claim 13 wherein the facet is polished to an angle of about 8 degrees.

15. The isolator of claim 1 wherein a facet of the beam expanding device is antireflection coated to reduce reflections from the facet.

16. The isolator of claim 1 further comprising a heat sink configured to increase a power-handling capability of the optical isolator by dissipating energy of the back-reflected light.

17. The isolator of claim 1 wherein an axis of the output polarizer is tilted with respect to an optical axis between the input fiber and the output fiber.

18. The isolator of claim 1 wherein an axis of the output polarizer is tilted by about 3.6 degrees with respect to an optical axis between the input fiber and the output fiber.

19. The optical isolator of claim 1, wherein the output fiber is fused to the beam expanding device.

20. An optical isolator, comprising:

an input module including an input fiber, an input polarizer, and an input collimator;

a state of polarization rotator module; and an output module including a multimode output fiber, a beam expander, an output polarizer, and an output collimator, an index of refraction of the multimode output fiber being matched to an index of refraction of the beam expander.

21. The isolator of claim 20 wherein a facet of a beam expanding device included in the output module is angle polished with respect to an optical axis between the input fiber and the output fiber.

22. The isolator of claim 20 wherein a facet of a beam expanding device included in the output module is angle polished to an angle of about 8 degrees with respect to an optical axis between the input fiber and the output fiber.

23. The isolator of claim 19 wherein a facet of a beam expanding device included in the output module is antireflection coated to reduce reflections from the facet.

24. The isolator of claim 20 wherein the output module is configured to excite a single mode of the multimode fiber.

25. The isolator of claim 20 wherein a facet of the input fiber is angle polished to reduce reflections from the facet.

26. The isolator of claim 20 wherein a facet of the input fiber is antireflection coated to reduce reflections from the facet.

27. The isolator of claim 20 wherein a facet of a beam expanding device included in the output module is angle polished to reduce reflections from the facet.

28. The isolator of claim 27 wherein the facet is polished to an angle of about 8 degrees.

29. The isolator of claim 20 further comprising a heat sink configured to increase a power-handling capability of the optical isolator by dissipating energy of back-reflected light in the output module.

30. The isolator of claim 20 wherein an axis of the output polarizer is tilted with respect to an optical axis between the input fiber and the output fiber.

31. The isolator of claim 20 wherein an axis of the output polarizer is tilted by about 3.6 degrees with respect to an optical axis between the input fiber and the output fiber.

32. An optical isolator comprising:

an input module including an input fiber;

an output module including an output fiber having a facet within the optical isolator; and means for reducing damage to the facet of the output fiber caused by any back-reflected light received through the output fiber.

* * * * *